United States Patent [19]
Kounev et al.

[11] Patent Number: 5,939,115
[45] Date of Patent: Aug. 17, 1999

[54] METHOD AND APPARATUS FOR DECONTAMINATING POULTRY CARCASSES

[75] Inventors: Zheko V. Kounev, 609 S. 6th St., Goshen, Ind. 46526; Venelin Z. Kounev, Goshen, Ind.

[73] Assignees: Zheko V. Kounev; Venalin Z. Kounev, both of Ind.; Louis D. Caracciolo, N.J.

[21] Appl. No.: 09/049,584

[22] Filed: Mar. 27, 1998

Related U.S. Application Data

[63] Continuation-in-part of application No. 08/868,359, Jun. 3, 1997, abandoned
[60] Provisional application No. 60/037,280, Feb. 3, 1997.
[51] Int. Cl.⁶ .............................. A22C 21/00; A23B 4/00
[52] U.S. Cl. .................. 426/238; 62/65; 99/451; 99/516; 134/73; 134/131; 134/184; 426/506; 452/173
[58] Field of Search ..................... 426/238, 506, 426/320, 335, 532; 99/451, 516; 422/20, 28, 292; 134/73, 131, 184; 452/173, 188; 62/65

[56] References Cited

U.S. PATENT DOCUMENTS 3,240,026  3/1966  Van Dolah et al. ..................... 62/65
5,484,615  1/1996  Kounev ................................. 426/238

FOREIGN PATENT DOCUMENTS 0406980  1/1991  European Pat. Off. ............... 452/173

*Primary Examiner*—George Yeung
*Attorney, Agent, or Firm*—Baker & Daniels

[57] ABSTRACT

An apparatus for bacteriologically decontaminating poultry carcasses and then chilling the carcasses to a preservation temperature includes a decontaminating tank and a chilling tank. The decontaminating tank holds a disinfectant solution, which is maintained at a temperature from about 45°–75° C. The poultry carcasses are immersed in the tank for a period of about 3–10 seconds, depending upon the temperature, higher temperatures requiring less time than lower temperatures. Sonic transducers are used to sonicate the poultry to dislodge bacteria, and spray curtains wash the bacteria off of the carcasses. The heated temperature increases the effect of the disinfectant solution. After removal of the carcasses from the decontaminating tank, they are transferred to a chilling tank, which contains a liquid maintained at a temperature from about 0°–3° C. The carcasses remain in the chilling tank for at least 45 minutes, to assure that the carcasses are thoroughly cooled.

11 Claims, 3 Drawing Sheets

METHOD AND APPARATUS FOR DECONTAMINATING POULTRY CARCASSES

This application is a Continuation-in-Part of U.S. patent application 08/868,359, filed Jun. 3, 1997, now abandoned, which claims the benefit of U.S. Provisional application No. 60/037,280, filed Feb. 3, 1997.

The present invention relates to an apparatus for removing and killing pathogenic bacteria from poultry carcasses to improve bacteriological quality and physical cleanliness of poultry.

BACKGROUND OF THE INVENTION

Pathogenic bacteria potentially causing human disease are carried on poultry carcasses. U.S. Pat. No. 5,484,615 discloses a chilling tank which contains a decontaminating liquid into which the carcasses are placed in a disinfectant solution for a time period sufficient to lower the temperature of the carcass to a preservation temperature. Generally, the temperature of the liquid in the chilling tank is maintained in a temperature range from about 0°–3° C., and the poultry product must remain in the chilling tank for about 45 minutes to reduce the temperature of the poultry product to the required temperature. In addition to the disinfectant solution, the carcasses are sprayed with the solution to dislodge bacteria and are also treated by ultrasonic transducers mounted within the tank to sonicate the poultry skin to dislodge the bacteria. However, due to the low temperature of the disinfectant solution in the tank and other reasons, removal of the bacteria is only partially effective. For example, when the poultry product enters the tank for chilling, the feather folliculi shrink, thereby protecting the pathogenic bacteria adjacent the folliculi from contact with the disinfectant within the tank. Furthermore, a thin film of the chilled water forms over the carcass skin when the product is placed in the low temperature chilling tank, which also impedes contact by the disinfectant.

SUMMARY OF THE INVENTION

According to the present invention, poultry carcasses are treated in a pasteurizing tank before being placed in a chilling tank. The pasteurizing or disinfecting tank is filled with a disinfecting liquid, which is heated to a temperature of approximately 45°–75° C. The carcasses are dipped into the liquid and then removed, remaining in the liquid for about 3–10 seconds, depending upon the temperature of the bath within the aforementioned range. The carcasses pass ultrasonic transducers mounted within the tank which sonicate the poultry to dislodge the bacteria. In addition, the carcasses pass through liquid curtains generated by submerged nozzles which draw their liquid supply from within the tank. The liquid curtains also dislodge bacteria and insure that the disinfectant solution penetrates any film formed over the surface of the poultry skin. Because the temperature of the disinfectant solution is at a pasteurizing temperature, the effectiveness of the disinfectant solution is enhanced, and any bacteria are killed. As the poultry carcasses are conveyed out of the tank, rinse nozzles supplied with fresh disinfectant solution spray the carcasses. The liquid from the spray is routed back into the tank to replenish the disinfectant solution. A conveyer belt extends across the bottom of the tank to catch carcasses which accidentally fall from the transport mechanism, and transports the fallen carcasses to the tank outlet for removal from the tank.

BRIEF DESCRIPTION OF THE DRAWINGS

The above-mentioned and other objects of the present invention, and the manner of attaining them, will become more apparent and the invention itself will be better understood by reference to the following description of the invention taken in conjunction with the accompanying drawings, wherein.

DESCRIPTION OF THE INVENTION

The preferred embodiment disclosed below is not intended to be exhaustive or to limit the invention to the precise form disclosed in the following detailed description. Rather, the embodiment is chosen and described so that others skilled in the art may utilize its teachings.

Figure 1:
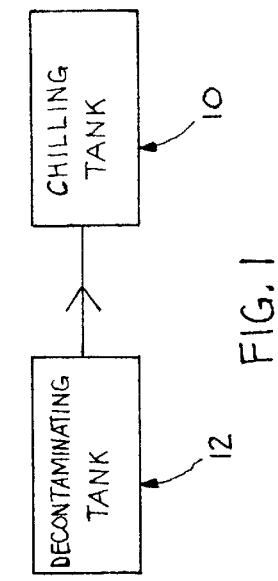
FIG. 1 is a block diagram illustrating applicant's invention schematically.

Referring now to FIG. 1 of the drawings, poultry carcasses which have been eviserated and defeathered are treated in a decontaminating tank 12 before being transferred to a chilling tank 10. The chilling tank 10 is constructed in accordance with the teachings of the above-identified U.S. Pat. No. 5,484,615. Poultry products are transferred from the decontaminating tank 12 made according to the present invention to the chilling tank 10 made according to the teachings of the above-identified patent. The chilling tank 10 is filled with a chilling liquid, which is cooled to a temperature of about 0°–3° C. The poultry carcasses remain in the chilling tank for a minimum of about 45 minutes, which is sufficient to cool the poultry carcasses.

To insure that the poultry carcasses are thoroughly decontaminated before being placed in the chilling tank 10, the carcasses are dipped in the decontaminating tank generally indicated by the numeral 12. As disclosed hereinbelow, the decontaminating tank 12 is filled with a disinfecting liquid, which is heated to a pasteurizing temperature of about 45°–75° C. Accordingly, any bacteria or other contaminations are killed, thereby assuring decontamination of the poultry products. The carcasses are dipped into the decontaminating tank 12 and then removed, and remain in the tank only for about 3–10 seconds, depending upon the temperature of the disinfecting solution in the tank.

The tank 12 includes side walls 14, bottom wall 16, end walls 18, and a partial cover 20. Cover 20 forms an inlet opening 22 at the inlet end 24 of tank 12, an outlet opening 26 at the tank outlet end 28, and a longitudinal slot 30 extending between inlet opening 22 and outlet opening 26. A transport mechanism or conveyor 32 of the type commonly employed in poultry processing lines for transporting poultry carcasses 33 is supported above tank 12 in a longitudinal orientation over slot 30. Transport mechanism 32 includes an inclined inlet segment 34 which lowers carcasses 33 into inlet opening 22, a horizontal lower segment 36, and an inclined outlet segment 38 which lifts carcasses 33 from tank 12 through outlet opening 26.

Figure 3:
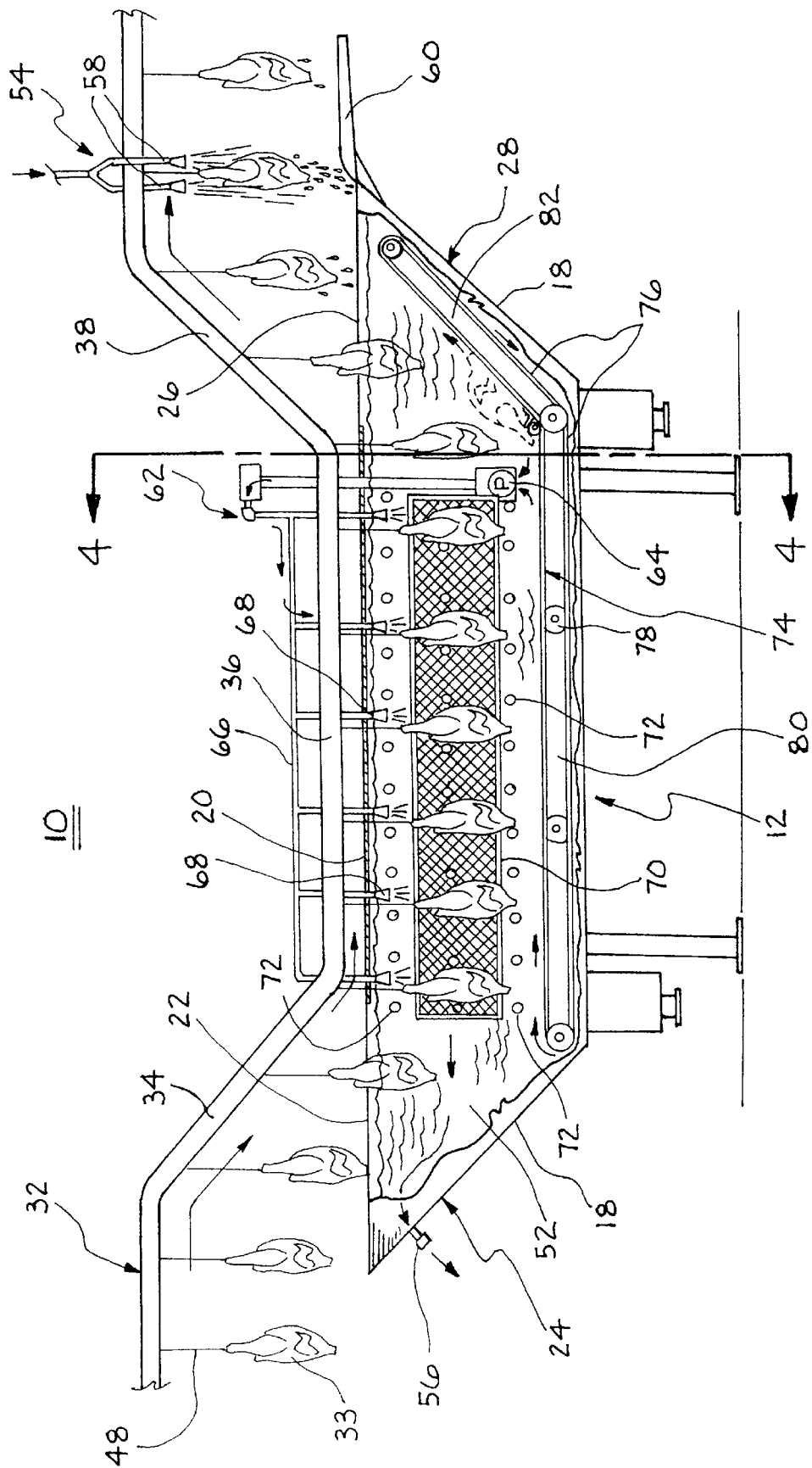
FIG. 3 is a fragmented, side elevational view of the apparatus of FIG. 2.
Figure 4:
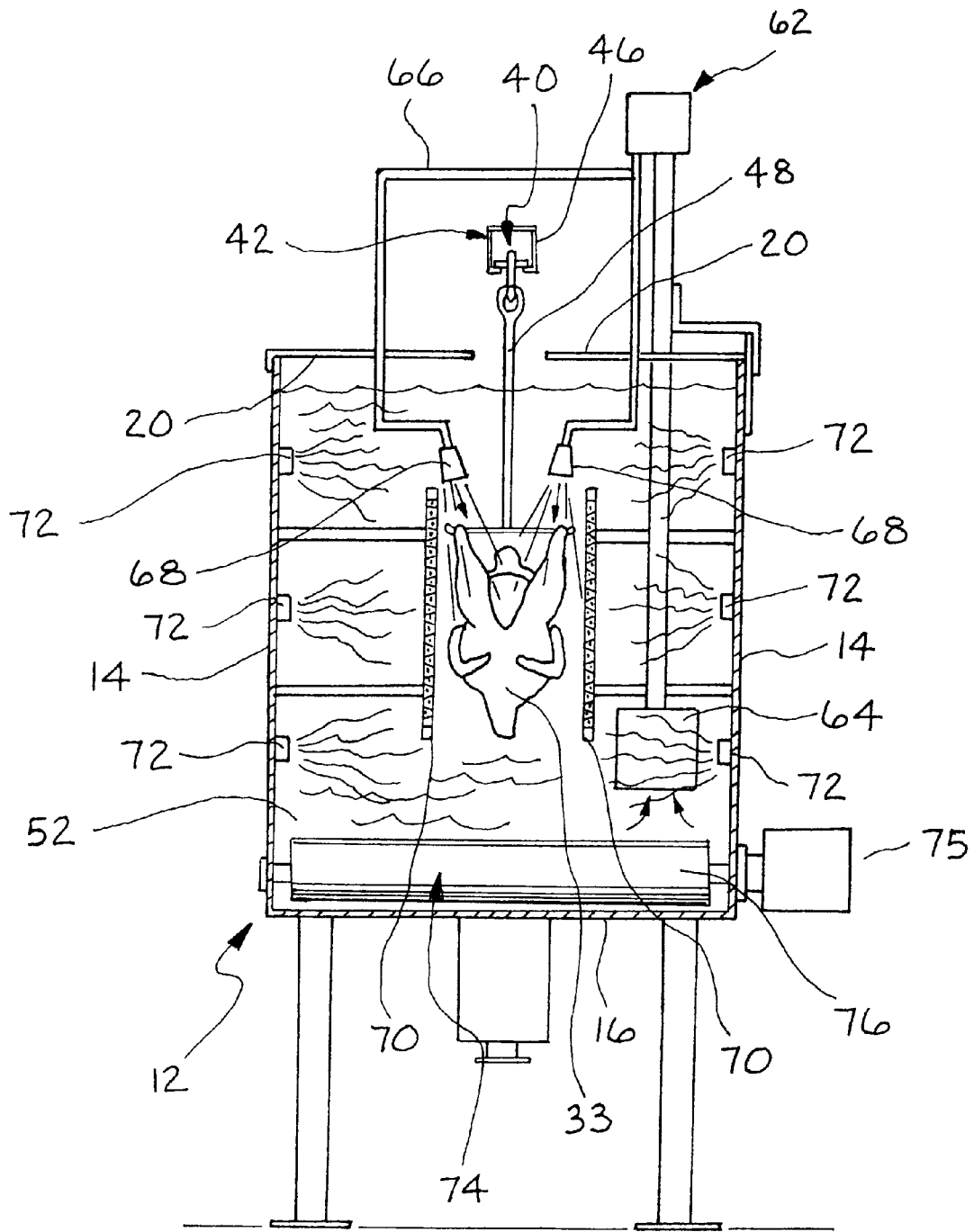
FIG. 4 is a cross-sectional view taken substantially along line 4—4 of FIG. 3.

As best shown in FIG. 3, transport mechanism 32 includes a chain 40 operably connected to a sprocket motor drive (not shown) and driven through guide channel 42. Poultry carcasses 33 are suspended below chain 40 by hangers 48 which are attached to the chain.

Figure 2:
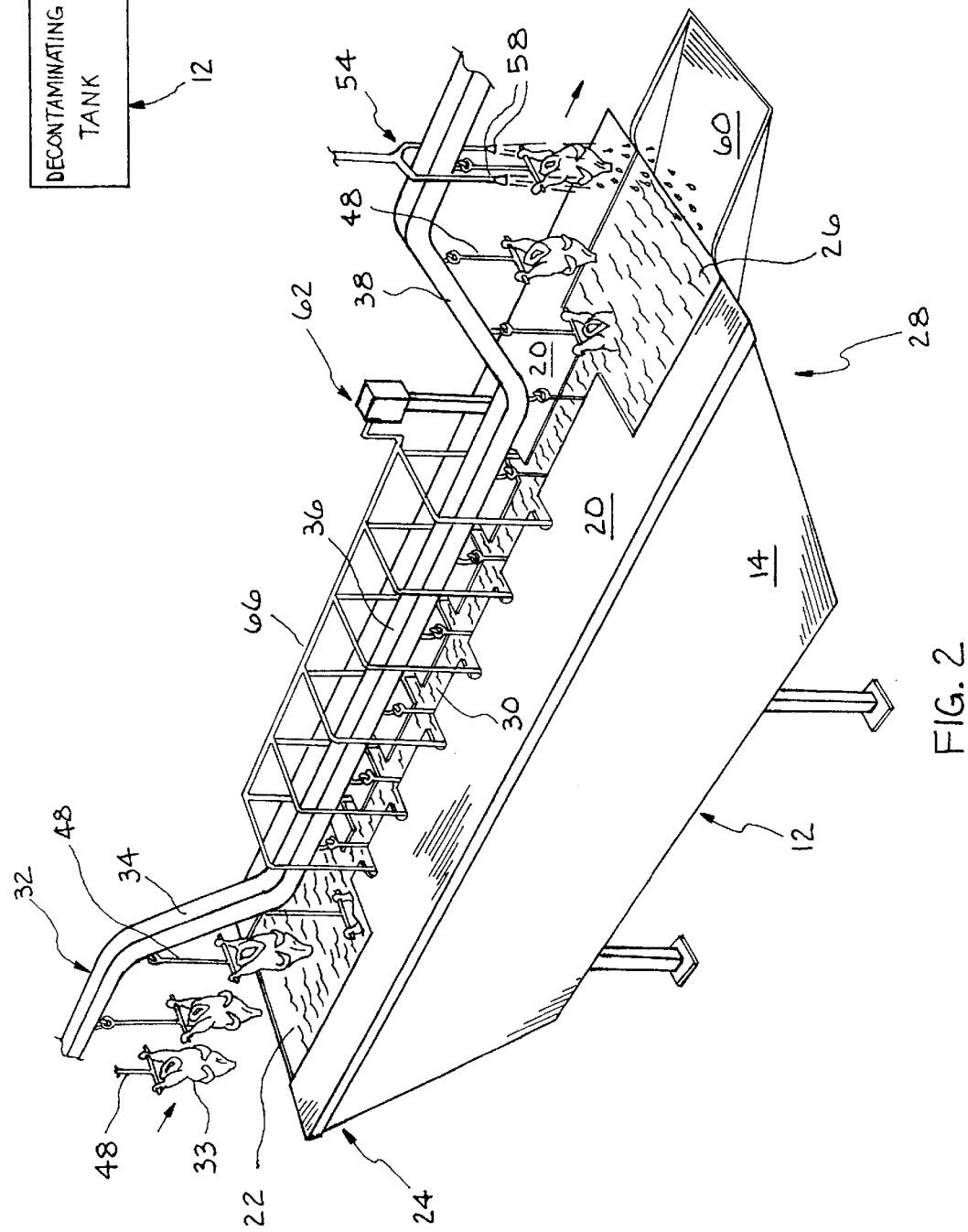
FIG. 2 is a perspective view of the decontamination apparatus according to the present invention.

Referring now to FIG. 2, tank 12 contains a disinfectant solution 52 which is a mixture of water and any commercially used and FDA approved bactericide, such as chlorine, which effectively operates on bacteria commonly found in poultry. Fresh quantities of solution 52 are introduced into tank 12 by rinse shower 54 at outlet opening 26 to replace the solution removed from the tank through outlet port 56 located near inlet end 24. Rinse shower 54 includes a pair of shower heads 58 which are directed downwardly on either side of transport mechanism 32 toward carcasses 33 being carried thereunder. A drip chute 60 extends from outlet end 28 under rinse shower 54 to catch solution 52 falling from carcasses 33 and emitted from rinse shower 54. The incline of drip chute 60 ensures that the solution 52 flows back into outlet opening 26. The amount of solution withdrawn through port 56 is preferably slightly less than the amount of solution being introduced through shower 54 (allowing for solution carry off by the carcasses) so as to maintain a constant solution level in tank 12. By replenishing solution 52 within tank 12 in this manner, apparatus 10 advantageously provides a countercurrent flow of solution from outlet end 28 to inlet end 24 against the flow of carcasses 33.

Apparatus 10 also includes plumbing 62 which includes a pump 64 that draws solution 52 from the lower portion of tank 12 and distributes the solution under pressure through a manifold 66 to dispensing outlets 68. Outlets 68 straddle and extend into tank 12 through cover sections 20 on either side of transport mechanism 32 from manifold 66. Outlets 68 are located near the surface of solution 52 and are directed substantially downwardly toward the underlying path of carcasses 33. As further explained below, dispensing outlets 68 create standing curtains of water which clean the poultry carcasses 33 as they pass through the curtains. The pressure of the solution emitted from outlets 68 may cause passing carcasses 33 to move laterally. Accordingly, a pair of parallel screens 70 are suspended within tank 12 to guide carcasses 33 under outlets 68.

Additionally, apparatus 10 includes a plurality of transducers 72 connected to an ultrasonic wave generator (not shown) by conventional sound-carrying conduit. Transducers 72 are mounted within tank 12 to side walls 14 and directed toward the path of carcasses 33. In a preferred embodiment, transducers 72 operate at a frequency of 40 kilohertz with 100 watts output power. Transducers 72 are positioned within tank 12 to provide approximately 6–10 seconds of sonication to all sides of each carcass 33 being transported through tank 12.

A conveyor 74 is positioned at the bottom of tank 12 along bottom wall 16. Conveyor 74 extends across substantially the entire width of tank 12 and includes a continuous endless web 76 rotated by rollers 78. Conveyor 74 has a horizontal segment 80 which extends along bottom wall 16 from the inlet end 24 of tank 12 to the outlet end 28, and an inclined segment 82 which extends upwardly along end wall 18 toward outlet opening 26 terminating near the surface of solution 52. Conveyor 74 may be powered by either an electrical motor 75 or a manual hand crank.

Mode of Operation

Initially, tank 12 is filled with solution 52 of water having a desired concentration of disinfectant at a temperature of 45°–75° C. The temperature of solution 52 depends upon the desired level of decontamnination. Warmer temperatures enhance the decontamination effect. The poultry carcasses 33 previously attached to hangers 48, are introduced into tank 12 through the inlet opening 22 along inlet segment 34 of transport mechanism 32. As the carcasses 33 are lowered into the solution 52, they pass between guide screens 70 and are transported longitudinally along the screens by horizontal segment 36 of transport mechanism 32. As carcasses 33 move from inlet opening 22 to outlet opening 26, they pass through a plurality water curtains created by dispensing outlets 68. The carcasses also pass through the directed ultrasound from transducers 72. In combination, the dispensing outlets 68 and transducers 72 result in enhanced decontamination of the carcasses. The sound waves from transducers 72 dislodge pathogens which are attached to the poultry skin and feather folliculi and discourage the formation of the thin water film barrier usually formed on the carcasses during chilling and disinfecting, thereby promoting contact between the disinfectant solution 52 and the pathogens upon the poultry skin. The water curtains also discourage the formation of the water barrier around the poultry skin while simultaneously mixing the disinfectant uniformly throughout tank 12. In addition, the water curtains also force disinfectant into contact with carcasses 33 to remove bacteria dislodged from the poultry skin by the sonic waves. In a preferred embodiment, the temperature of solution 52 emitted from outlets 68 is between 45°–75° C. This elevated temperature also enhances the decontamination effect of solution 52.

As a result of the constant bombardment of ultrasound, repeated applications of water curtains, and the countercurrent flow of solution 52, the carcasses 33 become progressively cleaner and more bacteria-free as they move toward the outlet end 28 of tank 12. The cleaned carcasses 33 are lifted through tank outlet opening 26 by outlet segment 38 of transport mechanism 32. After the carcasses 33 are lifted completely from solution 52, they are transported under rinse shower 54 which provides a final cleansing rinse of fresh solution 52 to remove any residual contaminants from the carcasses. Chute 60 directs the overspray from rinse shower 54 back into outlet opening 26 to replenish the quantities of solution removed by outlet port 56. As such, the level of solution 52 in tank 12 remains substantially constant.

In the event that a carcass 33 becomes detached from its supporting hanger 48 during transport through tank 12, the carcass will sink to the bottom of tank 12 and come to rest on top of conveyor 74. An operator will observe the empty hanger at some point after the hanger emerges from outlet opening 26 and conclude that a detached carcass 33 remains at the bottom of tank 12. The operator may then activate conveyor 74 to move the detached carcass 33 along horizontal segment 36 of web 76, up inclined segment 82, and through outlet opening 26 for retrieval. In the alternative, conveyor 74 may be continuously motorized to automatically eject fallen carcasses from tank 12. In either case, the transport of carcasses 33 through tank 12 is not interrupted by the retrieval of a fallen carcass 33.

As discussed above, the carcasses remain in the tank 12 for only a few (3–10) seconds, depending on temperature. Because of the elevated temperature, the disinfectant solution is more effective than at the cooling temperature of the chilling tank 10, so that the carcasses are decontaminated in the relatively short time period they remain in tank 12. After passing through tank 12, the carcasses are chilled in chilling tank 10.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and fall within the scope of the appended claims.

What is claimed is:

1. Apparatus for decontaminating poultry carcasses comprising:
    a first tank containing disinfectant solution at a temperature of between 45°–75° C., said first tank including spaced side walls and opposite end walls;
    transport means operably associated with said first tank for supporting the poultry carcasses for movement along a transport path to immerse the poultry carcasses into said disinfectant solution and to thereafter remove the poultry carcasses out of said tank about 3–10 seconds after the poultry carcasses are immersed in said first tank;
    a plurality of ultrasonic transducers mounted adjacent said transport path to sonicate the poultry carcasses transported along said transport path; and a second tank containing a chilling liquid, said second tank including means for cooling, said liquid to a chilling temperature of between about 0°–3° C., said poultry carcasses being immersed in said chilling liquid for a minimum of about 45 minutes sufficient to cool the poultry carcasses immediately after being removed from the first tank.

2. The apparatus of claim 1 further comprising a rinse shower disposed adjacent said first tank to direct said solution onto the poultry carcasses lifted from said first tank.

3. The apparatus of claim 2 wherein said tank includes a drip chute extending from said first tank and located under said rinse shower to direct said solution delivered by said rinse shower into said first tank.

4. The apparatus of claim 1 wherein said first tank includes a conveyor extending under said transport means beneath said transport path to receive any poultry carcasses which fall from said transport means, said conveyor including an inclined segment to convey said fallen poultry carcasses out of said first tank.

5. The apparatus according to claim 1 wherein said tank includes a pair of guide screens at least partially submerged in the solution on either side of said transport path to limit the lateral movement of the poultry carcasses being transported therethrough.

6. The apparatus of claim 1 wherein said transport mechanism includes a motor driven chain extending through a guide channel, and a plurality of hangers suspended below said chain each for carrying a poultry carcass.

7. The apparatus of claim 1 wherein said first tank further includes a cover, said cover defining an inlet opening adjacent one end wall of said first tank and an outlet opening adjacent the other end wall of said first tank.

8. The apparatus of claim 1, wherein plumbing is connected to said first tank for drawing the solution from said first tank and delivering the solution under pressure to a plurality of dispensing outlets, said dispensing outlets extending into said first tank to direct the solution into said transport path toward the poultry carcasses being transported therethrough.

9. Method of decontaminating poultry carcasses comprising the steps of immersing the poultry carcasses after defeathering and eviseration in a bath of disinfectant solution maintained at a temperature of 45°–75° C., for about 3–10 seconds. directing ultrasonic waves toward said poultry carcasses as they are immersed in said bath of disinfectant solution, removing the poultry carcasses from the bath of disinfectant solution, and then immersing the poultry carcasses in a chilling bath of chilled liquid maintained at a temperature of about 0°–3° C. for at least about 45 minutes immediately after removing the poultry carcasses from the bath of disinfectant solution.

10. The method of decontaminating poultry carcasses as claimed in claim 9, including the step of rinsing said poultry carcasses with the disinfectant solution after the poultry carcasses are removed from the disinfectant bath and before the poultry carcasses are immersed in the chilled liquid.

11. The method of decontaminating poultry carcasses as claimed in claim 9, wherein curtains of said disinfectant solution are directed toward said poultry carcasses while the poultry carcasses are immersed in the disinfectant solution.

* * * * *